US008562833B2

(12) United States Patent
Marcum

(10) Patent No.: US 8,562,833 B2
(45) Date of Patent: Oct. 22, 2013

(54) SUBSURFACE WAVE POWER GENERATION WATER PURIFICATION SYSTEMS AND METHODS

(75) Inventor: Elbert Lee Marcum, Deer Park, TX (US)

(73) Assignee: Clean and Green Enterprises, Inc., Tallahassee, FL (US)

( * ) Notice: Subject to any disclaimer, the term of this patent is extended or adjusted under 35 U.S.C. 154(b) by 651 days.

(21) Appl. No.: 12/758,788

(22) Filed: Apr. 12, 2010

(65) Prior Publication Data

US 2010/0193447 A1  Aug. 5, 2010

Related U.S. Application Data

(63) Continuation-in-part of application No. 12/753,087, filed on Apr. 1, 2010, which is a continuation-in-part of application No. 12/543,133, filed on Aug. 18, 2009, now abandoned.

(60) Provisional application No. 61/212,416, filed on Apr. 10, 2009, provisional application No. 61/189,309, filed on Aug. 18, 2008.

(51) Int. Cl.
| | |
|---|---|
| *B01D 63/00* | (2006.01) |
| *B01D 24/00* | (2006.01) |
| *C02F 1/00* | (2006.01) |
| *C02F 9/00* | (2006.01) |
| *B01D 61/00* | (2006.01) |

(52) U.S. Cl.
USPC ............... 210/257.2; 210/416.1; 210/416.3; 210/170.11; 210/259; 210/652; 416/9; 416/53

(58) Field of Classification Search
USPC ........... 210/652, 195.1, 170.01, 416.2, 257.2, 210/170.11, 416.1, 416.3, 225, 259; 60/495, 501, 327, 398; 290/53; 361/681; 417/330; 415/2.1; 416/1, 9, 416/79, 53

See application file for complete search history.

(56) References Cited

U.S. PATENT DOCUMENTS

| | | | | |
|---|---|---|---|---|
| 3,995,170 | A * | 11/1976 | Graybill | 290/55 |
| 4,001,597 | A * | 1/1977 | Graff | 290/53 |
| 4,335,576 | A * | 6/1982 | Hopfe | 60/398 |
| 4,371,788 | A | 2/1983 | Smith, Jr. | |
| 4,384,450 | A * | 5/1983 | Sawyer | 57/254 |
| 5,266,006 | A * | 11/1993 | Tsui et al. | 416/119 |
| 5,549,445 | A * | 8/1996 | Schremp | 415/2.1 |
| 6,139,750 | A * | 10/2000 | Graham | 210/652 |

(Continued)

FOREIGN PATENT DOCUMENTS

| | | |
|---|---|---|
| WO | 2004/097212 | 11/2004 |
| WO | WO 2004/097212 A1 * | 11/2004 |

*Primary Examiner* — Ana Fortuna

(74) *Attorney, Agent, or Firm* — Allen, Dyer, Doppelt, Milbrath & Gilchrist, P.A.

(57) ABSTRACT

A subsurface wave action harnessing system includes a seabed mounting plate adapted for securing to a seabed, a wing having generally opposed first and second wing surfaces extending between a first and second wing ends, the second wing end being pivotably mounted to the seabed mounting plate such that pivoting motion about a pivot axis generally parallel to the mounting plate is imparted to the wing by subsurface wave action acting on the first and second wing surfaces, and a drive arm pivotably connected to the wing to convert the pivoting motion into reciprocal motion. An electrical generator, water purifier or other wave action load can be driven by the drive arm.

10 Claims, 7 Drawing Sheets

(56) References Cited

U.S. PATENT DOCUMENTS

| | | |
|---|---|---|
| 6,392,314 B1 * | 5/2002 | Dick .................................. 290/53 |
| 6,766,643 B2 * | 7/2004 | Christensen ..................... 60/398 |
| 7,131,269 B2 * | 11/2006 | Koivusaari ....................... 60/495 |
| 2004/0007881 A1 * | 1/2004 | Kobashikawa et al. ......... 290/53 |
| 2008/0232054 A1 * | 9/2008 | Chen et al. ..................... 361/681 |
| 2009/0152871 A1 * | 6/2009 | Ching .............................. 290/54 |
| 2010/0013229 A1 * | 1/2010 | Da Costa ......................... 290/53 |

\* cited by examiner

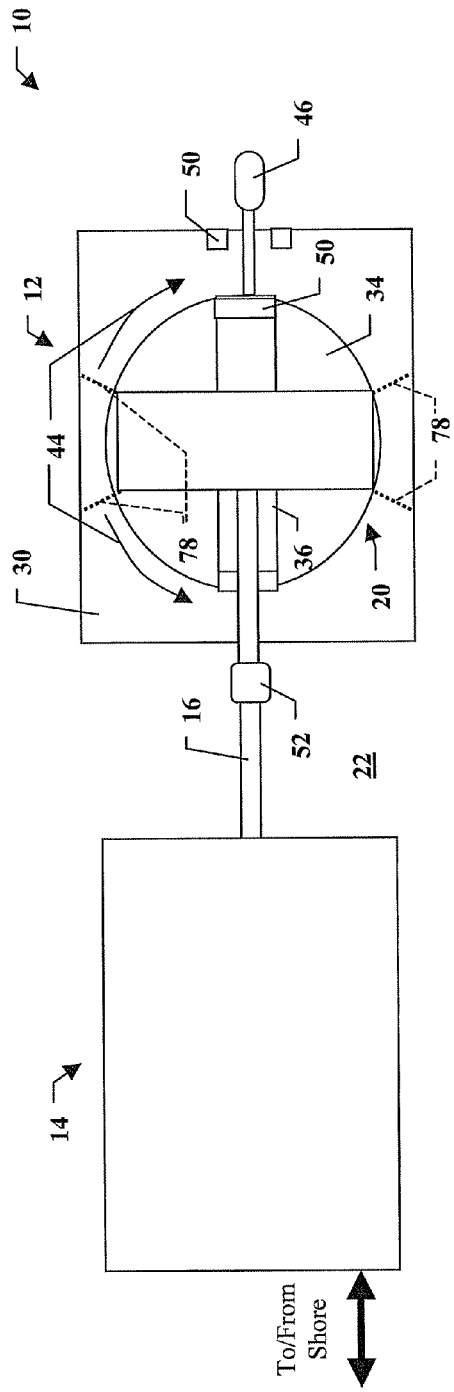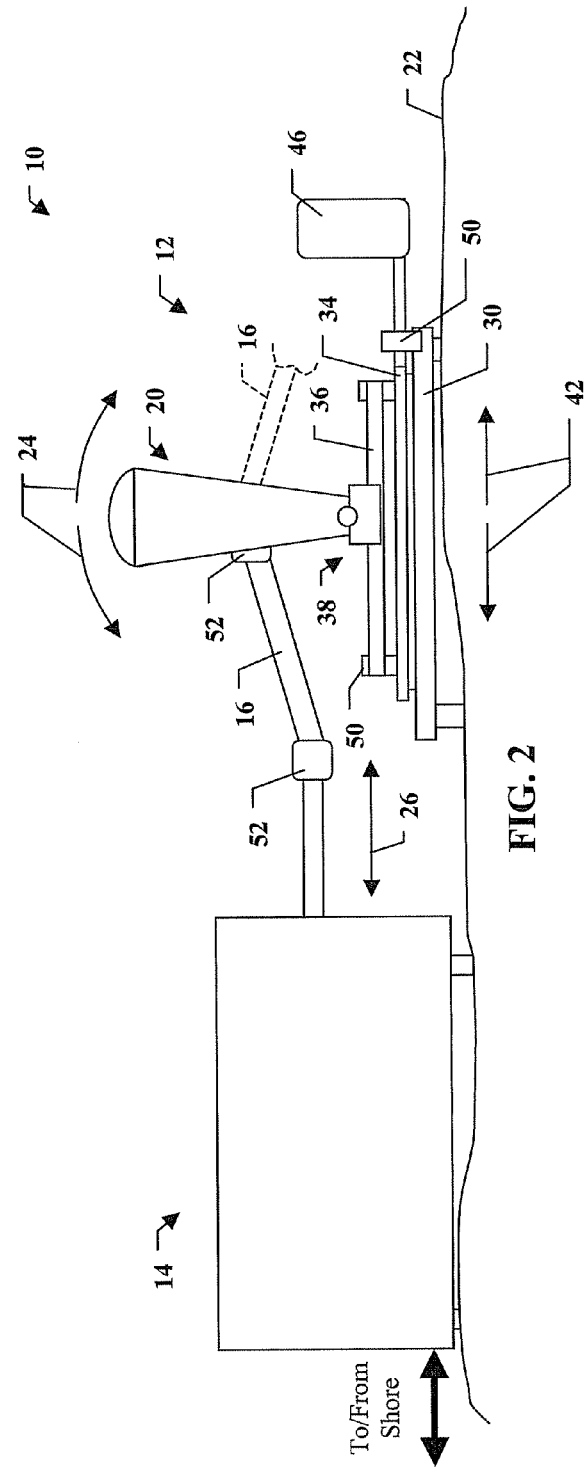

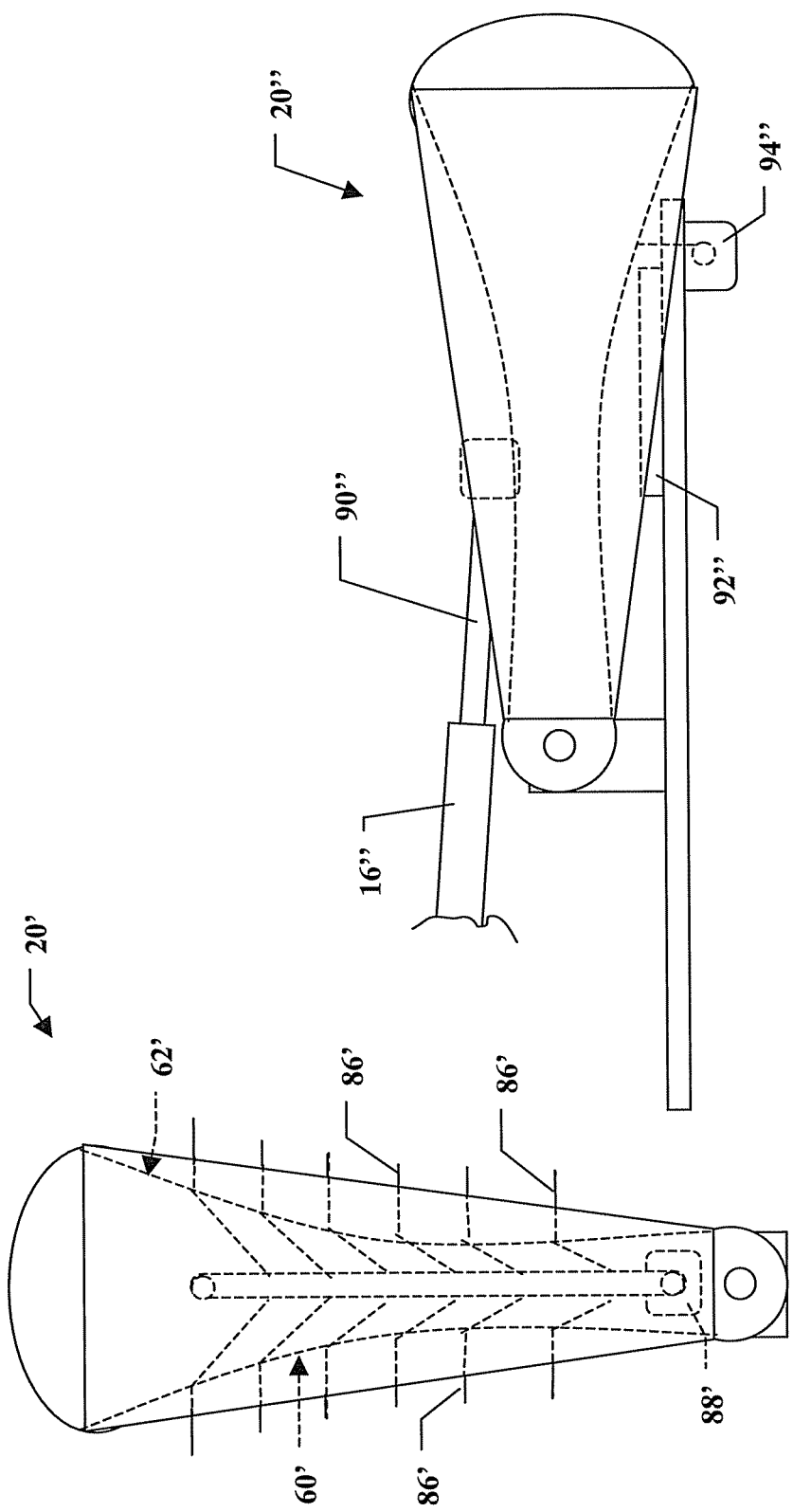

SUBSURFACE WAVE POWER GENERATION WATER PURIFICATION SYSTEMS AND METHODS

CROSS-REFERENCE TO RELATED APPLICATIONS

This application claims the benefit of U.S. Provisional Application Ser. No. 61/212,416, filed on Apr. 10, 2009, and is a continuation-in-part of U.S. application Ser. No. 12/753,087, filed on Apr. 1, 2010, which is a continuation-in-part of U.S. application Ser. No. 12/543,133, filed on Aug. 18, 2009, which claims the benefit of U.S. Provisional Application Ser. No. 61/189,309, filed on Aug. 18, 2008, the content of which applications are hereby incorporated by reference in their entirety.

FIELD OF THE INVENTION

The present invention relates to harnessing hydro-kinetic energy, and more particularly, to the generation of electrical power and purification of water using subsurface wave action.

BACKGROUND OF THE INVENTION

With the potential downsides of conventional fossil fuel and nuclear power sources well known, ongoing efforts are being made to practically and economically exploit clean, renewable power sources. The energy latent in the movement of water, or hydro-kinetic energy, was one of humankind's earliest power sources and is increasingly being looked to again for clean, renewable power.

Where there is a consistent and rapid flow of water, generating hydro-kinetic power is relatively easy. For example, many hydroelectric plants have been established in connection with dams along rivers. Unfortunately, the environmental impact of damming a river can be quite high. Limited efforts have been made to place turbines directly on riverbeds, to allow river power to be harnessed without the major environmental impact of a dam. However, such turbine systems still require the presence of a suitable river.

Harnessing tidal energy is another approach being explored, and to some degree, exploited. While tidal energy is theoretically available along all ocean coastlines, tidal flow characteristics vary greatly from place to place. Additionally, the approximately 12 hour tidal cycle does not lend itself to continuous power generation at a given location. Instead, recurring periods of virtually no tidal flow will alternate with long periods of increasing and decreasing flow.

Although wave magnitude can vary greatly between coastal locations, some appreciable wave action is likely to be present along virtually all ocean coastlines. Additionally, larger lakes and seas can experience significant wave action. However, most wave power systems being tested tend to focus on surface waves. While wave magnitude is generally greatest at the surface, it is also more prone to significant fluctuations with changes in wind conditions. These fluctuations can more readily result in damage to, or loss of, power generating equipment. Also, at least some components of the power generating equipment must be at or very near the surface, where such components can present a hazard to navigation.

Subsurface wave action at relatively shallow depths underwater (approximately 30-80 feet), while correlating to surface wave activity, tends to be much more regular. Accordingly, subsurface wave action represents a potentially widespread and consistently-utilizable source of clean, renewable power.

Attempts have been made to utilize subsurface wave action for power generation, including the development of systems with pivotably mounted wings that move back and forth with the wave action; however, further improvements are possible.

Additionally, desalinization of ocean is underutilized as a source of fresh water for many reasons, including the power consumption required by typical desalinization methods.

SUMMARY OF THE INVENTION

In view of the foregoing, it is an object of the present invention to provide improved systems and methods for harnessing wave energy. It is a further object of the present invention to convert the harnessed wave action into electrical power and/or purified water. According to an embodiment of the present invention, a subsurface wave power generation system includes a seabed mounting plate adapted for securing to a seabed, a wing having generally opposed first and second wing surfaces extending between a first wing end and a second wing end, the second wing end being pivotably mounted to the seabed mounting plate such that pivoting motion about a pivot axis generally parallel to the mounting plate is imparted to the wing by subsurface wave action acting on the first and second wing surfaces, and a drive arm pivotably connected to the wing to convert the pivoting motion into reciprocal motion.

According to an aspect of the present invention, a wing directional plate is rotatably mounted to the seabed mounting plate. The wing is pivotably connected to the seabed mounting plate via the rotating direction plate, such that the wing is rotatable about a rotation axis generally perpendicular to the seabed mounting plate.

According to another aspect of the present invention, the wing includes a float arranged along the first wing end and urging the wing into a vertical position. According to an additional aspect of the present invention, the first and second wing surfaces are both concave.

According to further aspects of the present invention, the system includes an electrical generator driven by the drive arm. The drive arm drives the electrical generator through a slip linkage. The slip linkage includes a first stage that converts the reciprocal motion of the drive arm into rotational motion and a second stage that selectively engages the a drive shaft of the generator drive to impart the rotational motion thereto.

According to additional aspects of the present invention, the system includes a fluid chamber having a fluid chamber inlet and an outlet, a piston displaceable within the fluid chamber, a drive arm connected to the piston and operable to reciprocally displace the piston within the fluid chamber, and a reverse osmosis assembly connected to the fluid chamber outlet.

According to a method aspect of the present invention, A method for harnessing subsurface wave action includes displaceably mounting a generally trapezoidal, biconcave wing underwater oriented generally perpendicularly to a sub-surface wave propagation direction, and reciprocating a drive arm using generally cyclic displacement of the wing.

These and other objects, aspects and advantages of the present invention will be better appreciated in view of the drawings and following detailed description of preferred embodiments.

BRIEF DESCRIPTION OF THE DRAWINGS

FIG. 1 is a schematic top view of a subsurface wave action harnessing system including a pivotally mounted wing and a wave action load, according to an embodiment of the present invention;

FIG. 2 is a schematic side view of the subsurface wave action harnessing system of FIG. 1;

FIG. 5 is a schematic side view of an alternate embodiment of the wing of FIG. 1, with hidden components shown in broken lines;

FIG. 6 is a schematic side view of another embodiment of the wing of FIG. 1, with hidden components shown in broken lines;

DETAILED DESCRIPTION OF PREFERRED EMBODIMENTS

Figure 4:
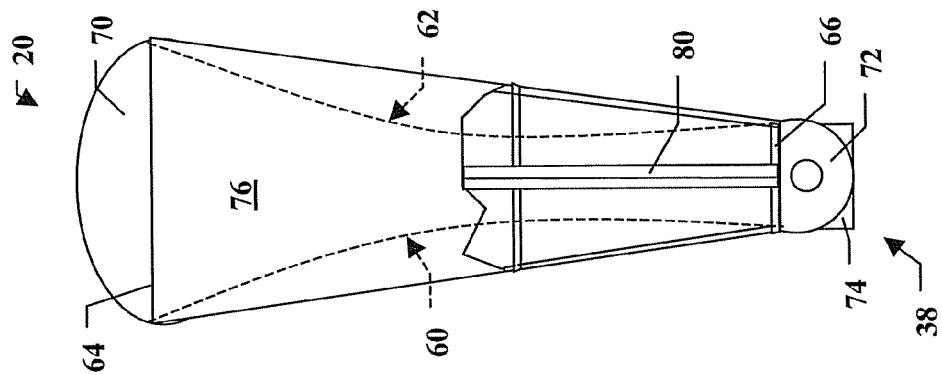
FIG. 4 is a schematic side view of the wing of FIG. 1, with hidden components shown in broken lines and partially cutaway to show details.

Referring to FIGS. 1 and 2, according to an embodiment of the present invention, a subsurface wave action harnessing system 10 includes a wing assembly 12 and a wave action load 14 connected by a drive arm 16. The wing assembly 12 includes a wing 20 that is pivotably mounted to the seabed 22, such that subsurface wave action imparts a pivoting motion 24 to the wing 20. The drive arm 16 connects to the wing 20 and converts the pivoting motion into a reciprocal motion 26 for utilization by the wave action load 14. The wave action load 14, as will be explain in greater detail below, can include an electrical generator assembly adapted to transmit generated electricity to shore and/or a water purification assembly adapted to make purified water from seawater for transport to shore. The wave action load 14 is also adapted to send and receive data and command/control information from off-site.

Although the present embodiment is described in connection with an electrical generator assembly and a water purification assembly, it will appreciated that the wing assembly 12 could be used to drive other loads. Additionally, it will be appreciated that the system 10 could include an array of wing assemblies 12 and/or a plurality of similar or different wave action loads 14.

The wing assembly 12 further includes a seabed mounting plate 30 securely seated upon the seabed 22. A wing directional plate 34 is rotatably mounted to the seabed mounting plate 32, and a wing mounting rail 36 is arranged on the directional plate 34. A carriage mechanism 38 allows the wing 20 to travel in a sliding motion 42 and the pivoting motion 24 relative to mounting rail 36. As a result, the wing 20 is able to move in the pivoting motion 24, the sliding motion 42 and a rotating motion 44 in response to subsurface wave action. It will be appreciated that the directional plate 34 and/or the rail 36 could be omitted, such that the wing 20 was simply pivotably mounted directly to the mounting plate 30. Additionally, it will be appreciated that a wing that was only slidably displaceable upon the mounting plate 30 could be used.

Preferably, the wing 20 is able to travel approximately 180 degrees, (+/− approximately 90 degrees from an upright position) in the pivoting direction 24 under the influence of subsurface wave action. A directional vane 46 extends from the wing directional plate 34 to help keep the wing 20 approximately broadside on to the prevailing direction of subsurface waves. Stopping blocks 50 limit the sliding and rotating motions 42, 44 of the wing 20. Preferably, the rotating motion 44 is limited to approximately 14 degrees to avoid excessive stresses on the drive arm 16.

The drive arm 16 traverses a plurality of universal joints 52 to facilitate the transition between the pivoting motion 24 of the wing 20 and the reciprocal motion 26 to be supplied to the electrical generator assembly 14. Additionally, the joints 52 can accommodate some rotation of the wing 20 on the wing directional plate 36. Preferably, the drive arm 16 attaches at or near the center of the wing 20, although multiple alternate attachment points could be included. It will appreciated that the drive arm 16 could include further joints to traverse additional angles, as well as to branch into multiple drive arms to supply multiple loads. If desired, a second drive arm 16 (see broken lines) could be added opposing the first drive arm, and one or more additional loads connected thereto.

Figure 3:
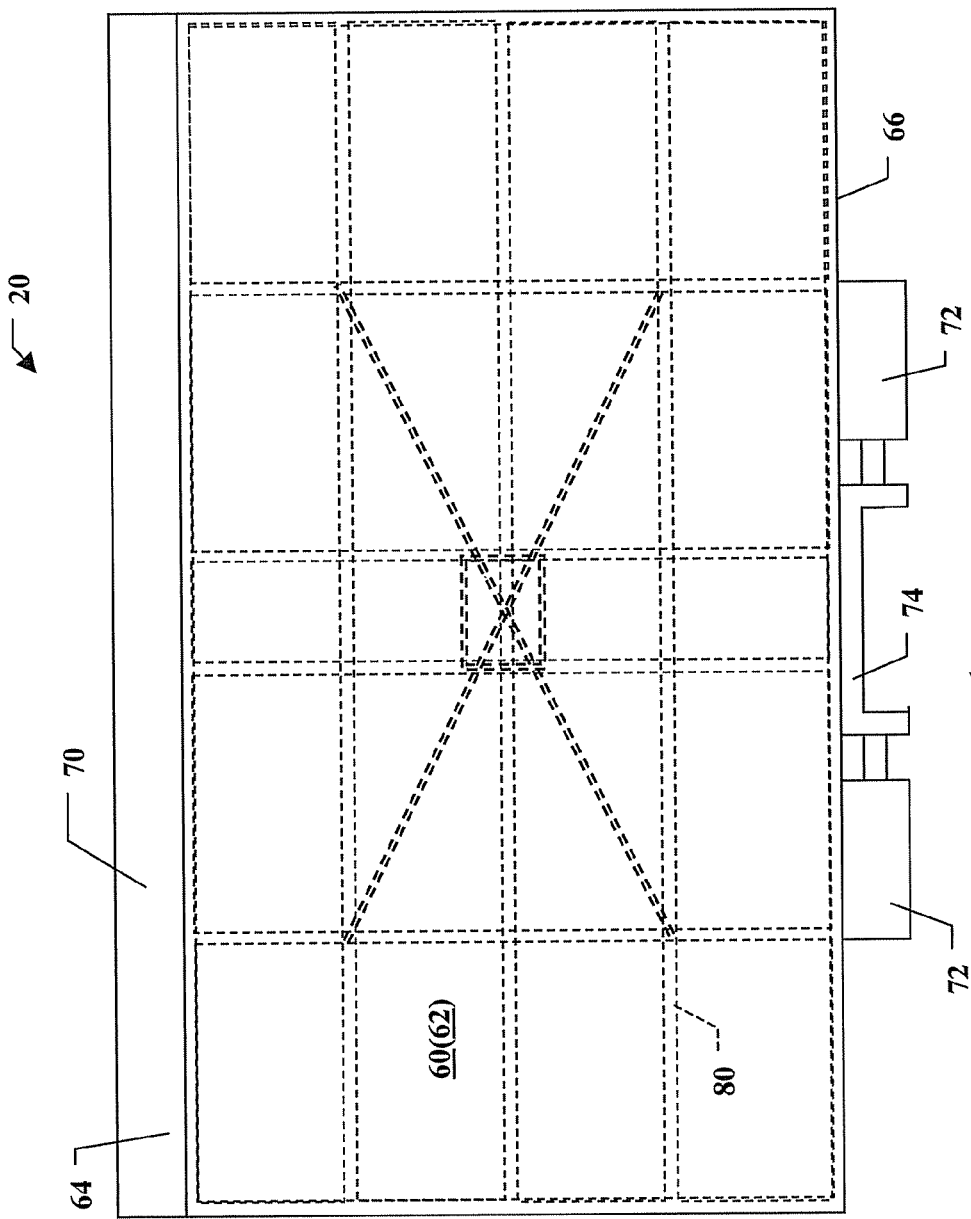
FIG. 3 is a schematic front view of the wing of FIG. 1, with hidden components shown in broken lines.

Referring to FIGS. 3 and 4, the wing 20 has generally opposed first and second wing surfaces 60, 62 extending between first and second wing ends 64, 66. A float 70 extends along the first wing end with sufficient buoyancy to urge the wing 20 upright following pivoting movement away from vertical. The second wing end 66 connects to the carriage mechanism 38 (including pivot joints 72 allowing pivoting motion between the second wing end 66 and a sliding carriage 74). Generally wedge-shaped side panels 76 extend between the first and second wing surfaces 60, 62.

The first and second wing surfaces 60, 62 are both concave, resulting in a biconcave arrangement that is believed to enhance the pressure exerted on the wing 20 through a pivoting cycle, together with the side panels 76 and the float 70. Outwardly extending flanges 78 (see FIG. 1) could also be added to increase the effective surface area of the first and second wing surfaces 60, 62. Internal framework 80 adds strength and rigidity to the wing. The framework 80 is reinforced near the center of the wing 20, to allow for more secure attachment of the driving arm 16.

Referring to FIGS. 5 and 6, wings can be equipped with rough weather survival features to prevent or minimize damage during periods of dangerously high subsurface wave action. Referring particularly to FIG. 5, the first and second wing surfaces 60', 62' of a wing 20' incorporate a plurality of louvers 86'. The louvers 86' open to allow water to pass through the wing 20', decreasing the thrust exerted thereon. A louver control motor 88', or other device, can be used to selectively open and close the louvers 86', or the louvers can simply be biased to remain closed until a predetermined thrust level is reached.

Where the louvers 86' are selectively opened and closed, advantageously, operation is automatic based upon weather conditions. For instance, the system 10 can receive weather forecast data and open and closed the louvers 86' based thereon. Alternately, the system 10 can sense local weather conditions. In the latter example, the system 10 can also be used to provide weather data to interested parties.

Referring to FIG. 6, the wing 20" can be folded down flat to ride out rough weather. To facilitate lay down of the wing 20", the drive arm 16" can include a solenoid-activated telescoping extension 90". An electromagnetic 92" could also be arranged in the mounting plate 30" to facilitate lay down, as well as a normally slack cable drive 94" that could spool in to securely lay down the wing 20". It will be appreciated that the various features of FIGS. 5 and 6 could be used separately or in various combinations.

Figure 7:
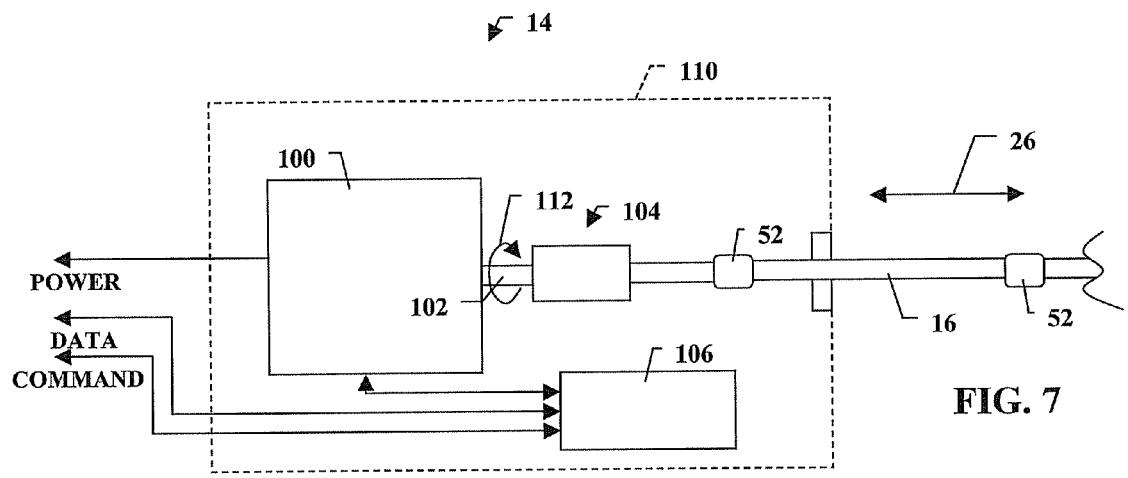
FIG. 7 is a schematic plan view of an electrical generator assembly serving as the wave action load of FIG. 1, including a slip linkage.

Referring to FIG. 7, the load 14 is an electrical generator assembly 14 including a rotating electrical generator 100, a generator drive shaft 102, a slip linkage 104 and control/power electronics 106 arranged within a watertight housing 110. The generator 100 and drive shaft 102 preferably rotates unidirectionally rotation direction 112. The slip linkage 104 converts the reciprocal motion 26 of the drive arm 16 into the unidirectional rotation in direction 112. Electricity generated by the generator 100 is transmitted back to shore (or to other electrical load(s)), and data and command can be sent and received by the control/power electronics 106.

It will be appreciated that any suitable generator 100 could be used, including AC and/or DC generators, and self-excited or separately-excited generators. Where a separately-excited generator is used, or for a generator requiring field flashing, field generation equipment can also be run off of the drive shaft 102. Advantageously, the slip linkage 104 of the present invention allows conventional rotating generator equipment to be used, although custom-built generators could also be employed in connection with the system 10.

Preferably, the drive arm 16 enters the housing 110 through suitable stuffing boxes, seals or the like to prevent excess water intrusion. A water pump (not shown) may be included to periodically remove water from the housing 110. A joint 56 can be located inside the housing 110, which can facilitate disconnection of the drive arm 16 for maintenance and help ensure even level reciprocal motion of the drive arm 16 relative to the slip linkage 104. Suitable combinations of bearings, such as thrust bearings, journal bearings, ring bearings and air bearings, can be used to help ensure proper alignment and low friction rotation of generator assembly 14 components.

Figure 8:
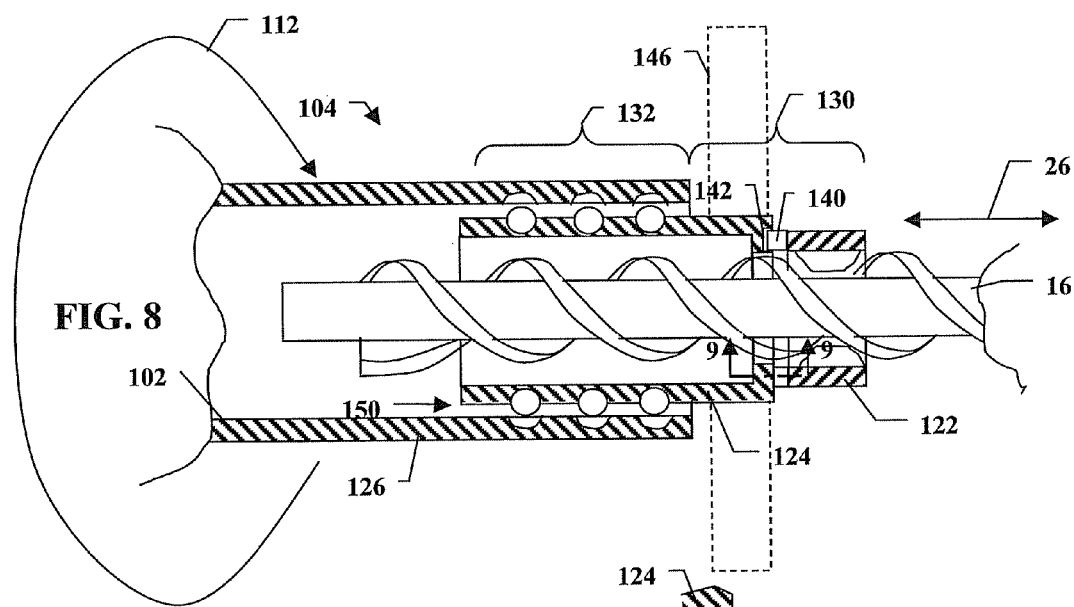
FIG. 8 is schematic sectional view of the slip linkage of FIG. 7.

Referring to FIG. 8, the slip linkage 104 includes a threaded terminal end 120 of the drive arm 16, a threaded collar 122, a rotation transmission sleeve 124 and a terminal end 126 of the generator drive shaft 102. The slip linkage 104 effectively has a first stage 132 that converts the reciprocal motion 26 of the drive arm into unidirectional rotational motion 112, and a second stage 134 that selectively engages the generator drive shaft 102 to impart the rotational motion thereto 112.

The threading on the terminal end 120 of the drive arm 16 and on the interior of the threaded collar 122 can be of any suitable design that permits the collar 122 to rotate as a result of reciprocation of the drive arm 16 while retaining a limited freedom of reciprocal motion. The collar 122 will rotate in direction 112 when the drive arm 16 moves in one direction and will rotate counter to the direction 112, when the drive arm 16 moves in the opposite direction.

Figure 9:
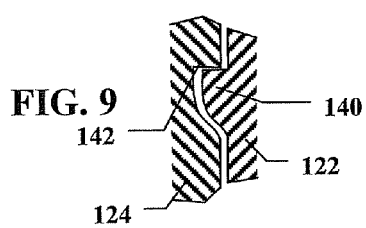
FIG. 9 is a section view taken along line 9-9 of FIG. 8.
Figure 10:
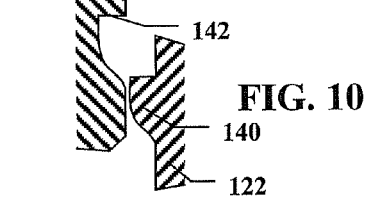
FIG. 10 is the sectional view of FIG. 9, in an alternate position.

When rotating in the direction 112, the threaded collar 122 will be urged toward the sleeve 124 and teeth 140 extending from the threaded collar 122 will engage corresponding recesses 142 in the sleeve 124 (FIG. 9). When rotating counter to the direction 112, the teeth 140 will be disengaged from the recesses 142 and the sleeve 124 will continue to rotate in the direction 112 (FIG. 10). A flywheel 146 or the like can be connected with the sleeve 124 to help conserve angular momentum when not being engaged by the collar 122.

A freewheel mechanism 150 extends between the rotation transmission sleeve 124 and the terminal end 126 of the generator drive shaft 102. When the rotational velocity of the of the drive shaft 102 is less than or equal to that of the sleeve 124, the mechanism 150 will engage until the drive shaft 102 speed again exceeds that of the sleeve 124. As a result, the risk of reverse motoring the drive arm 16 from the generator is reduced. The freewheel mechanism 150 can be a simple centrifugal arrangement, although other, more complex and controllable arrangements can be used. Additionally, generator drive shaft over speed protection can be implemented to disengage the drive shaft 102 if the rotational speed of the sleeve 124 becomes too high for the generator. Also, various reduction and/or amplification gearing arrangements can be used.

Figure 11:
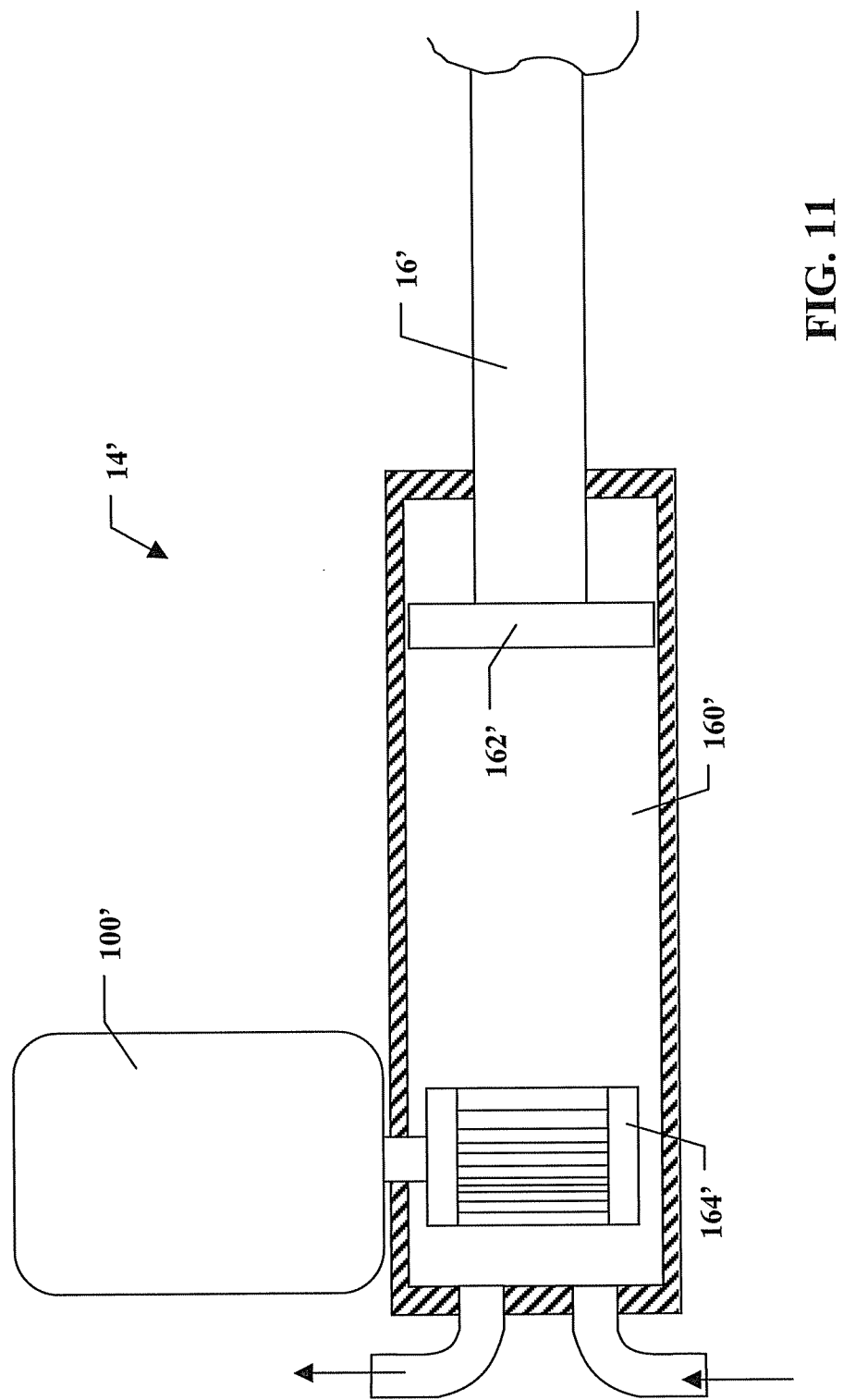
FIG. 11 is a partial schematic view of another embodiment of an electrical generator assembly serving as the wave action load of FIG. 1.

Referring to FIG. 11, in an alternate embodiment, a generator assembly 14' includes fluid chamber 160' in which a piston 162' on the end of a drive shaft 16' reciprocates, forcing fluid into and out of the chamber 160' past a turbine 164'. The turbine 164' rotates, turning a generator 100', which in turn generates electricity. The turbine 164' is preferably selected from among those types which rotate unidirectionally, regardless of the direction of fluid flow past their vanes.

Figure 12:
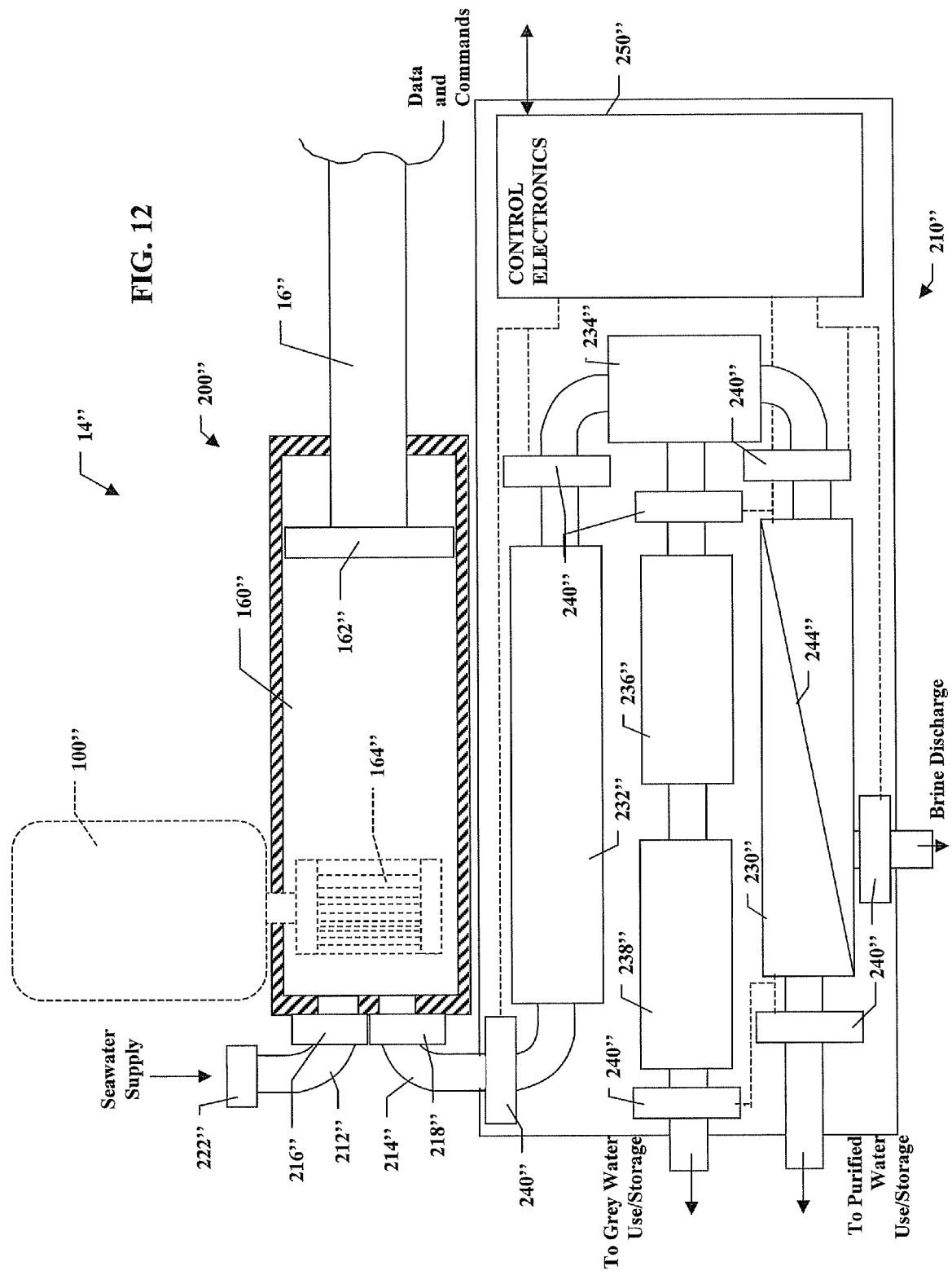
FIG. 12 is a partial schematic view of a water purification assembly serving as the wave action load FIG. 1, according to a further embodiment of the present invention.

Referring to FIG. 12, according to a further embodiment of the present invention, the load is a water purification assembly 14". The water purification assembly 14" includes a water pressurization assembly 200" and a reverse osmosis assembly 210". The water pressurization assembly 200" receives seawater therein and outputs pressurized seawater to the reverse osmosis assembly 210". The reverse osmosis assembly 210" outputs grey water and purified water for subsequent on- and/or off-shore use and/or storage.

The water pressurization assembly 200" includes a fluid chamber 160" with a piston 162" slidably disposed therein and reciprocally driven by a drive arm 16" connected to a wing assembly or other wave action harnessing device. The fluid chamber 160" has an inlet 212" adapted to receive seawater from the environment and an outlet 214" connected to the reverse osmosis assembly 210".

Respective inlet and outlet valve mechanisms 216", 218" are arranged in the inlet and outlet 212", 214". The inlet valve mechanism 216" is seated so as to open during withdrawal of the piston 162" and seal during insertion. The outlet valve mechanism 218" is seated so as to seal during withdrawal of the piston 162" and open during insertion. Various valve types can be employed for the valve mechanisms 216", 218"; for example, ball valves and/or flapper valves could be employed.

A pre-filter 222" is advantageously arranged in the fluid chamber inlet 212". The pre-filter 222" helps prevent fouling of the water pressurization assembly 200" components and can serve as a first stage of the seawater purification process. The pre-filter 222" is preferably a charcoal filter, and can also include an initial screen or mesh to remove coarser particles and prevent entry of marine life.

A turbine 164" and generator 100", similar to the turbine 164' and generator 100' can be associated with the water pressurization assembly 200". In this way, the motion of seawater into and out of the fluid chamber 160" can also be harnessed to generate electrical power. Some or all of this electrical power can be used to supply electrical power needs of the water purification assembly 14", as well as ancillary support equipment; for instance, booster pumps to help pump grey and/or purified water to shore. Also, electrical power for the water purification assembly 14" could be supplied by a separate electrical generator powered by the same wing assembly, or another wing assembly. The water purification assembly 14" could share a common housing with a separate electrical generator.

The reverse osmosis assembly 210" includes a reverse osmosis unit 230", a plurality of filters 232"-238" and a plurality of regulators 240". The filters 232"-238" are preferably activated charcoal filters, with at least one of the filters 236", 238" being a solid block charcoal filter, as opposed to granulated charcoal, for enhanced filtration. The filters 236", 238" are arranged in parallel with the reverse osmosis unit 230" and supply the grey water output for water uses requiring a lower degree of desalinization.

The reverse osmosis unit 230" includes an osmotic membrane 244". Purified water is discharged on the output side of the osmotic membrane 244" and brine is discharged on the input side.

Water flow and pressure throughout the reverse osmosis system 210" is controlled by the plurality of regulators 240". For instance, if there is in sufficient differential pressure for proper functioning of the reverse osmosis unit 230", the regulators 240" can operate to increase flow to the unit 230". For example, flow to the filters 236", 238" can be decreased or stopped altogether. The regulators 240" can be purely mechanical, and adapted to open and close under set conditions, but preferably the regulators are electronically actuated by control electronics 250" based on sensed pressures and/or flows. Additionally, the regulators 240" can be operated to avoid potentially dangerous overpressure conditions. Overpressure protective features can also be included in the fluid cylinder inlet and/or outlet valve mechanisms 212", 214".

It will be appreciated from the foregoing, that the present invention advantageously allows to motion of the sea, itself, to provide the motive force for purifying seawater in situ. Additionally, when using subsurface wave motion harnessing systems, like underwater wings, the need for large, unsightly and potentially polluting shore desalinization facilities can be minimized.

Figure 13:
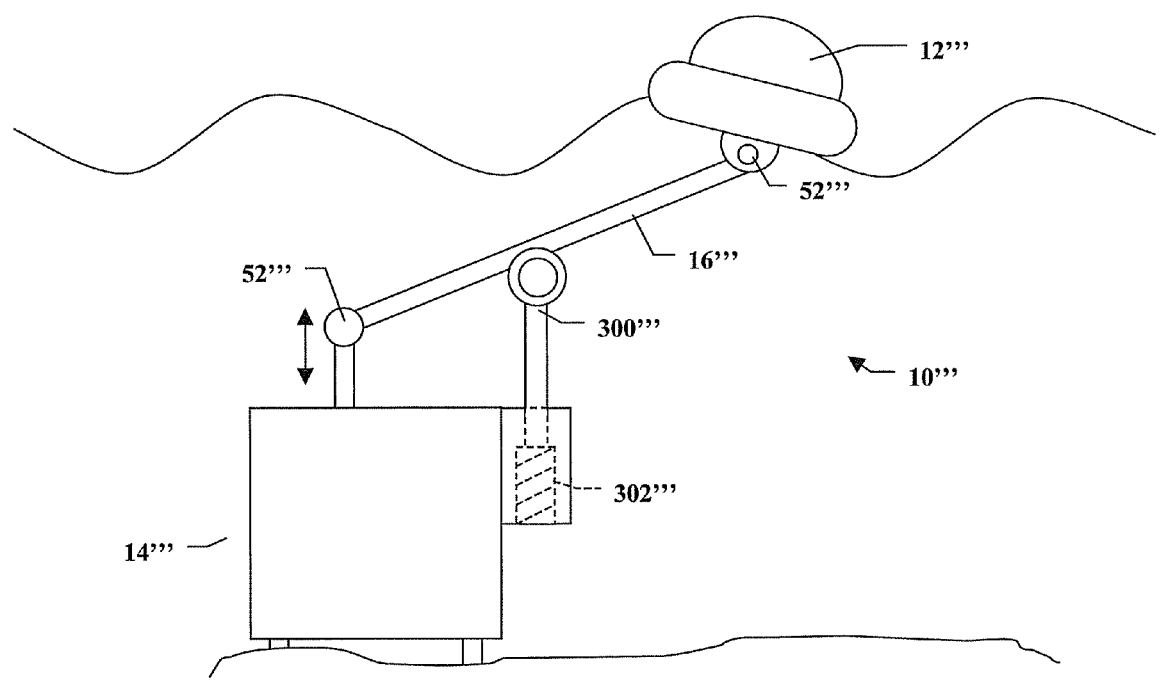
FIG. 13 is a schematic view of a surface wave action harnessing system, according to an additional embodiment of the present invention, for use in connection with the wave action loads of the present invention.

Although the wave action loads, such as generator and water purification assemblies are described above for use in connection with subsurface wave action, it will be appreciated that such loads could also be powered by surface wave action harnessing systems. Referring to FIG. 13, a surface wave action utilization system 10''' includes a buoy 12''' connected to a wave action load 14''' by a drive arm 16'''. The motion of the buoy 12''' in response to surface waves is translated into reciprocating motion 26''' to drive the load 14'''.

The buoy 12''' preferably includes instrumentation for monitoring sea and atmospheric conditions, which can be transmitted to shore. For extreme wave conditions, the buoy 12''' can be provided with one or more safety mechanisms to prevent damage to the rest of the system 10'''.

The drive arm 16''' traverses a plurality of joints 52''' to accommodate the variable motion of the buoy 12''' in frequently varying surface wave conditions. To help accommodate stresses on the drive arm 16", the drive arm 16''' can pivot about a roller arm 300'''. The roller arm 300''' is mounted to the load 14''' by a spring mechanism 302''' to help accommodate large level changes in the buoy 12'''.

Surface wave systems like the system 10''' can advantageously facilitate use of the various loads, or features thereof, in shallower waters closer to shore, cutting down on the distance that electrical power or purified water must be transmitted or pumped, respectively. Advantageously, the load 14''' need not necessarily be mounted directly to the seabed, and can instead be moored to the seabed (or other point) and adapted to maintain a relatively fixed depth. Accordingly, surface wave systems can be usefully employed in other areas where subsurface systems might be difficult or impractical; for example, in extremely deep water or where bottom contours making seabed mounting more difficult.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A subsurface wave action harnessing system comprising:
    a seabed mounting plate adapted for securing to a seabed;
    a wing having generally opposed first and second wing surfaces extending between a first wing end and a second wing end, the second wing end being pivotably mounted to the seabed mounting plate such that pivoting motion about a pivot axis generally parallel to the mounting plate is imparted to the wing by subsurface wave action acting on the first and second wing surfaces;
    a drive arm pivotably connected to the wing to convert the pivoting motion into reciprocal motion; and
    a water purification assembly driven by the drive arm, the water purification assembly including:
        a fluid chamber having a fluid chamber inlet and an outlet;
        a piston displaceable within the fluid chamber;
        a reverse osmosis assembly connected to the fluid chamber outlet; and
        a turbine disposed within the fluid chamber and connected to an electrical generator;
    wherein the drive arm is connected to the piston and operable to reciprocally displace the piston within the fluid chamber to supply pressurized water to the reverse osmosis assembly.

2. A wave action-driven water purification system comprising:
    a fluid chamber having a fluid chamber inlet and an outlet;
    a piston displaceable within the fluid chamber;
    a drive arm connected to the piston and operable to reciprocally displace the piston within the fluid chamber;
    a reverse osmosis assembly connected to the fluid chamber outlet; and
    a wave action harnessing system connected to the drive arm and operable to impart reciprocal motion thereto;
    a turbine disposed within the fluid chamber and connected to an electrical generator.

3. The system of claim 2, wherein the wave action harnessing system includes
    a seabed mounting plate adapted for securing to a seabed;
    a wing having generally opposed first and second wing surfaces extending between a first wing end and a second wing end, the second wing end being pivotably mounted to the seabed mounting plate such that pivoting motion about a pivot axis generally parallel to the mounting plate is imparted to the wing by subsurface wave action acting on the first and second wing surfaces; and
    wherein the drive arm is pivotably connected to the wing to convert the pivoting motion into the reciprocal motion.

4. The system of claim 2, wherein the wave action harnessing system includes a surface buoy connected to the drive arm.

5. The system of claim 4, wherein the drive arm pivots about a roller arm connected to the compression chamber.

6. The system of claim 5, wherein the roller arm is slidably displaceable relative to the compression chamber and biased by a spring.

7. The system of claim 2, further comprising a pre-filter connected with the compression chamber inlet.

8. The system of claim 2, wherein the reverse osmosis assembly includes:
   at least one filter; and
   a reverse osmosis unit having an osmotic membrane connected downstream of the filter.

9. The system of claim 8, wherein the at least one filter is a solid-block charcoal filter connected in parallel with the reverse osmosis unit.

10. The system of claim 8, wherein the reverse osmosis assembly includes at least one regulator adapted to control water pressure within the reverse osmosis assembly.

* * * * *